US012770555B2

(12) United States Patent
Chang et al.

(10) Patent No.: US 12,770,555 B2
(45) Date of Patent: Oct. 20, 2026

(54) DISPLAY APPARATUS

(71) Applicant: AUO Corporation, Hsinchu City (TW)

(72) Inventors: Che-Chia Chang, Hsinchu City (TW); Che-Wei Tung, Hsinchu City (TW); Mei-Yi Li, Hsinchu City (TW); Yu-Chieh Kuo, Hsinchu City (TW); Yu-Hsun Chiu, Hsinchu City (TW); En-Chih Liu, Hsinchu City (TW); Ming-Hung Chuang, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/253,958

(22) Filed: Jun. 29, 2025

(65) Prior Publication Data

US 2026/0171002 A1 Jun. 18, 2026

(30) Foreign Application Priority Data

Dec. 12, 2024 (TW) ................................ 113148490

(51) Int. Cl.
*G09G 3/32* (2016.01)

(52) U.S. Cl.
CPC ......... *G09G 3/32* (2013.01); *G09G 2300/026* (2013.01); *G09G 2300/0842* (2013.01); *G09G 2300/0861* (2013.01); *G09G 2310/08* (2013.01); *G09G 2320/0233* (2013.01); *G09G 2320/029* (2013.01); *G09G 2320/0626* (2013.01)

(58) Field of Classification Search
CPC ............... G09G 3/32; G09G 2300/026; G09G 2300/0842; G09G 2300/0861; G09G 2310/08; G09G 2320/0233; G09G 2320/029; G09G 2320/0626
See application file for complete search history.

(56) References Cited

U.S. PATENT DOCUMENTS

2014/0368414 A1* 12/2014 Kim ........................ H01G 4/005 361/301.1
2016/0055798 A1* 2/2016 Song .................... G09G 3/3233 345/691
2023/0029234 A1* 1/2023 Son ....................... G09G 3/3266
2025/0279049 A1* 9/2025 Choi .................... G09G 3/3233

FOREIGN PATENT DOCUMENTS

TW 1807786 7/2023

* cited by examiner

*Primary Examiner* — Hong Zhou
(74) *Attorney, Agent, or Firm* — JCIPRNET

(57) ABSTRACT

Provided is a display apparatus. The display apparatus includes a display module and a plurality of light-emitting driving circuits. Each light-emitting driving circuit includes a timing circuit and a driving circuit. The timing circuit receives multiple clock signals and a previous light-emitting timing signal to provide a light-emitting timing signal and an internal voltage. The driving circuit receives a plurality of phase signals, an all-on signal, and the internal voltage to provide a plurality of light-emitting driving signals to a plurality of pixels respectively, thereby enabling the plurality of pixels. The driving circuit is further configured to perform the following. In a driving mode, based on the plurality of phase signals, multiple light-emitting driving signals are sequentially enabled to sequentially enable multiple pixels. Also, in a sensing mode, based on the all-on signal, multiple light-emitting driving signals are simultaneously enabled to simultaneously enable multiple pixels.

17 Claims, 12 Drawing Sheets

DISPLAY APPARATUS

CROSS-REFERENCE TO RELATED APPLICATION

This application claims the priority benefit of Taiwan application serial no. 113148490, filed on Dec. 12, 2024. The entirety of the above-mentioned patent application is hereby incorporated by reference herein and made a part of this specification.

BACKGROUND

Technical Field

The disclosure relates to a display apparatus, and particularly relates to a light-emitting diode display apparatus.

Related Art

In modern times, due to the self-emitting characteristic of light-emitting diode displays, the backlight module may be omitted, thereby reducing volume and weight, and enabling a thinner form factor, which makes them more competitive for the future. Compared to organic light-emitting diode (OLED) displays, light-emitting diode displays have advantages such as high material stability, long service life, high brightness, nanosecond-level high-speed response, high-speed modulation, and signal carrying capabilities, thus gradually becoming the mainstream development for the new generation of displays.

Unlike the voltage driving mode of liquid crystal displays (LCD), micro light-emitting diodes (Micro-LED) are current-driven light-emitting components, and thus the driving mode of Micro-LED is an important design issue in light-emitting diode display apparatus.

SUMMARY

The disclosure provides a display apparatus that may switch between a driving mode and a sensing mode to simultaneously illuminate multiple panels in the sensing mode, thereby making the brightness of multiple panels consistent.

The display apparatus of the disclosure embodiment includes a display module and a plurality of light-emitting driving circuits. Each light-emitting driving circuit includes a timing circuit and a driving circuit. The timing circuit receives multiple clock signals and a previous light-emitting timing signal to provide a light-emitting timing signal and an internal voltage. The driving circuit receives a plurality of phase signals, an all-on signal, and the internal voltage to provide a plurality of light-emitting driving signals to a plurality of pixels respectively, thereby enabling the plurality of pixels. The driving circuit is further configured to perform the following. In a driving mode, based on the plurality of phase signals, multiple light-emitting driving signals are sequentially enabled to sequentially enable multiple pixels. Also, in a sensing mode, based on the all-on signal, multiple light-emitting driving signals are enabled at the same time to enable multiple pixels at the same time.

Based on the above, the brightness of the display apparatus according to embodiments of the disclosure may be displayed uniformly, thereby enhancing the user experience.

To make the foregoing features and advantages of the disclosure more comprehensible, embodiments are specifically provided below with detailed explanations in conjunction with the accompanying drawings.

DESCRIPTION OF THE EMBODIMENTS

Figure 1:
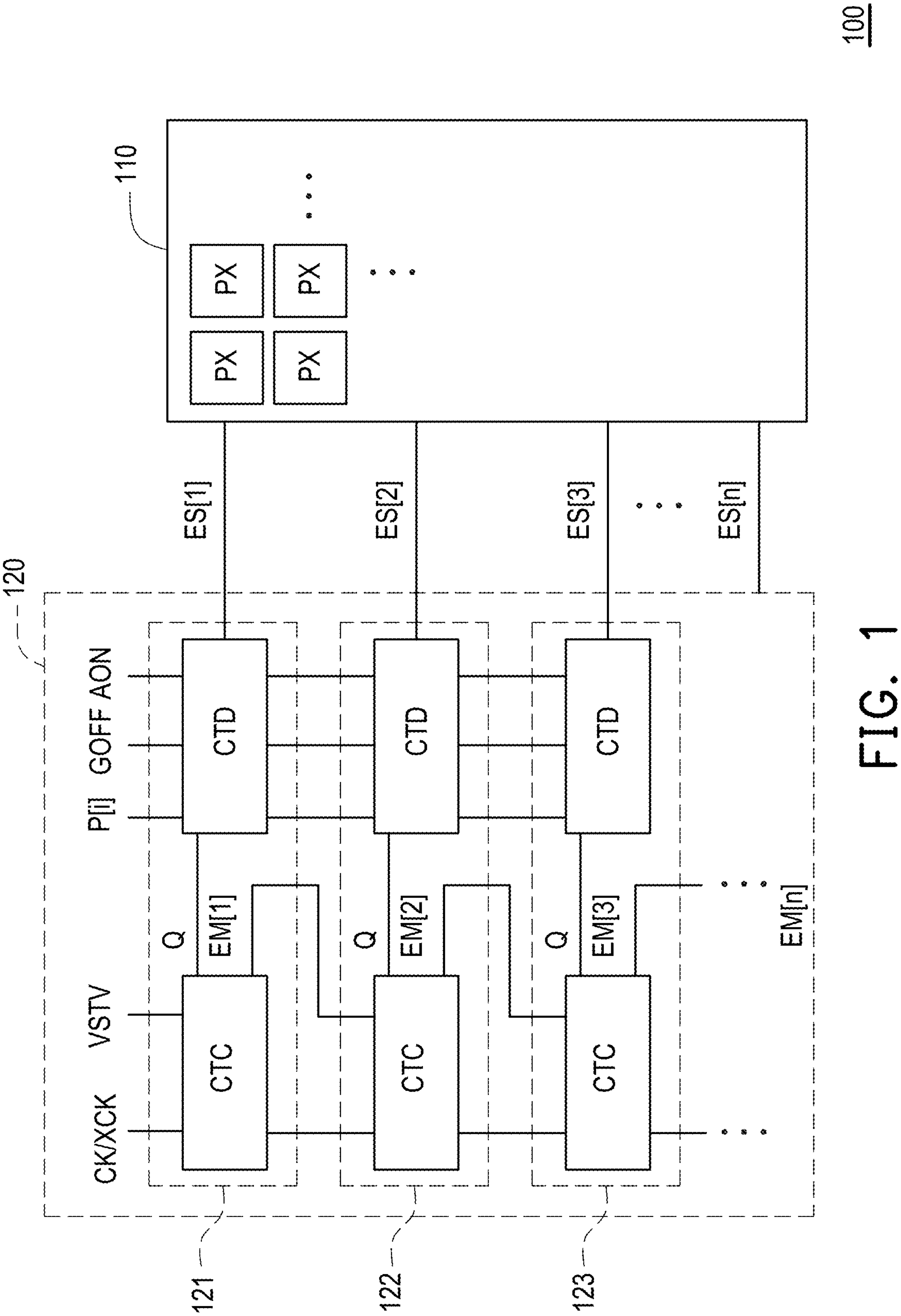
FIG. 1 is a system diagram of a display apparatus according to an embodiment of the disclosure.

Unless defined otherwise, all terminology (including technical and scientific terminology) used herein has the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

It should be understood that although the terms, for example, “first,” “second,” and “third,” may be used herein to describe various elements, components, regions, layers and/or sections, the elements, components, regions, layers and/or sections should not be limited by the terms. The terms are merely used to distinguish one element, component, region, layer, or section from another element, component, region, layer, or section. Thus, a “first element,” “component,” “region,” “layer”, or “section” discussed below could be termed a second element, component, region, layer, or section without departing from the teachings herein.

The terminology used herein is merely for the purpose of describing particular embodiments and is not intended to be limiting. As used herein, the singular forms “a,” “an,” and “the” are intended to include the plural forms, including “at least one,” unless the context clearly indicates otherwise. “Or” means “and/or. As used herein, the term “and/or”

includes any and all combinations of one or more of the associated listed items. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

A tiled display is a large-sized display formed by multiple panels. Due to slight differences in the manufacturing process and components of each panel, the brightness of each panel may be inconsistent after being tiled, causing uneven brightness distribution across the entire screen. This brightness inconsistency affects visual effects and reduces display quality. To improve the uneven brightness problem, it is necessary to detect the brightness of each panel. Also, based on the detected results, the brightness of each panel is compensated to achieve uniform brightness display effect. In order to efficiently detect the brightness of panels, all panels may be illuminated simultaneously, and brightness detection may be performed synchronously, thereby saving time. However, the operation mode of existing display modules adopts sequential illumination rather than simultaneous illumination.

Therefore, to improve the above-mentioned problems, this disclosure presents a solution. By adding control elements in the light-emitting driving circuit, the operation mode of the display module may be switched between the driving mode used for normal display and the sensing mode used for brightness detection. As a result, the brightness of the tiled screen can be displayed uniformly, thereby enhancing the user experience.

FIG. 1 is a system diagram of a display apparatus according to an embodiment of the disclosure. Referring to FIG. 1. In this embodiment, a display apparatus 100 includes at least a display module 110 and a light-emitting driver 120. Additionally, the light-emitting driver 120 includes multiple light-emitting driving circuits (such as 121 to 123).

In one embodiment, pixels PX of the display module 110 are arranged in an array, and the pixels PX in the display module 110 may be disposed on one or more panels (that is, one or more substrates), depending on the circuit design, and the disclosure is not limited thereto. Additionally, the display module 110 may include n rows of pixels PX, where n is a positive integer.

Each light-emitting driving circuit (such as 121 to 123) includes a timing circuit CTC and a driving circuit CTD. The timing circuit CTC receives clock signals CK and XCK, and receives a previous light-emitting timing signal (such as EM[1] to EM[3], EM[n], collectively referred to as EM) or a light-emitting start signal VSTV, to provide a light-emitting timing signal EM and an internal voltage Q.

It should be noted that the previous light-emitting timing signal EM[1] received by the light-emitting driving circuit 122 may be the light-emitting timing signal EM[1] output by the previous stage (light-emitting driving circuit 121), and the light-emitting timing signal EM[2] output by the light-emitting driving circuit 122 may be the previous light-emitting timing signal EM[2] for the next stage (light-emitting driving circuit 123). That is, for the nth stage, EM[n−1] is the previous light-emitting timing signal, EM[n] is the light-emitting timing signal, and EM[n+1] is the latter light-emitting timing signal. However, the disclosure is not limited thereto.

The driving circuit CTD receives one (such as P1) of multiple phase signals (such as P[i], where P[i] may include P1 to P6) and the internal voltage Q, to provide light-emitting driving signals (such as ES[1] to ES[3], ES[n], collectively referred to as ES) respectively to multiple pixels PX of the display module 120 based on the received phase signals (such as P1 to P6), a gate-off signal GOFF, an all-on signal AON, and the internal voltage Q. In one embodiment, the gate-off signal GOFF may be an inverted signal of the all-on signal AON. In another embodiment, the gate-off signal GOFF and the all-on signal AON are two independent signals, rather than the inverted signal of the all-on signal AON. However, the disclosure is not limited thereto.

In this embodiment, the operation mode of the display module 110 may be divided into two modes, a driving mode and a sensing mode. The driving mode is configured to allow the display module 110, based on the received signals, to sequentially illuminate the pixels PX, thereby displaying various different contents. On the other hand, the sensing mode is configured to allow the display module 110, based on the received signals, to simultaneously illuminate the pixels PX, thereby adjusting the brightness of the pixels PX or the panel to which the pixels PX belong through the value of the sensing current.

In the driving mode, the phase signals (such as P1 to P6) may be provided to the light-emitting driving circuits (such as 121 to 123) of the light-emitting driver 120, and the light-emitting driving signals ES are enabled multiple times during one frame period according to the phase signals (such as P1 to P6) received by the driving circuit CTD, so that a row of pixels PX are illuminated (that is, enabled) multiple times in one frame, thereby enabling the pixels PX row by row (sequentially) on the display module 110. Specifically, the driving circuit CTD directly outputs a first phase signal (such as one of P1 to P6) from the received phase signals as the corresponding light-emitting driving signal (such as ES[i−2] to ES[i+1]), where i is an index number. For example, the driving circuit CTD directly outputs the phase signal P1 as the light-emitting driving signal ES[i−2], and the driving circuit CTD directly outputs the phase signal P2 as the light-emitting driving signal ES[i−1].

In the sensing mode, the gate-off signal GOFF and the all-on signal AON may be provided to the light-emitting driving circuits (such as 121 to 123) of the light-emitting driver 120, and the light-emitting driving signals ES simultaneously illuminate all pixels PX on the display module 110 during one frame period according to the all-on signal AON, thereby sensing the current of each illuminated pixel PX. Specifically, the driving circuit CTD directly outputs the received all-on signal AON as the corresponding light-emitting driving signal. In this way, through the value of the sensing current of each pixel or the panel to which each pixel belongs, the brightness of each pixel or the panel to which each pixel belongs can be adjusted to be consistent, so that the brightness of the displayed image can be uniform, thereby enhancing the user experience.

It should be noted that in the sensing mode, the all-on signal AON is at an enable level, and in the driving mode, the all-on signal AON is at a disable level. Therefore, in the driving mode, the driving circuit CTD may directly output the first phase signal (such as one of P1 to P6) of the multiple phase signals as the light-emitting driving signal ES. Also, in the sensing mode, the driving circuit CTD may directly output the enable level as the light-emitting driving signal ES. In this way, the operation mode of the display module 110 may be operated between the driving mode and the sensing mode according to requirements, thereby enhancing the user experience.

Figure 2B:
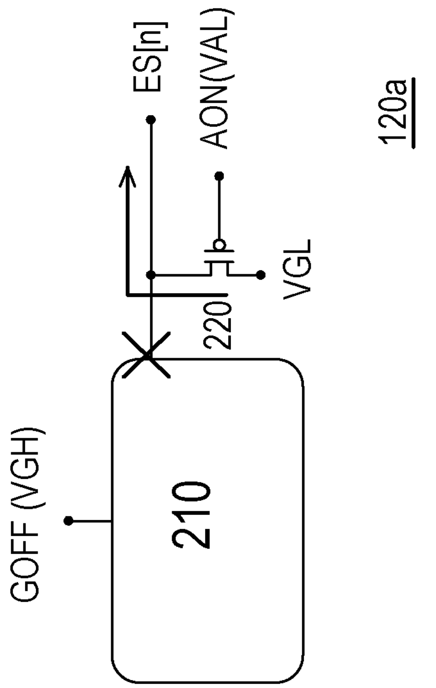
FIG. 2B is a circuit diagram of the light-emitting driving circuit according to an embodiment of the disclosure.
Figure 2A:
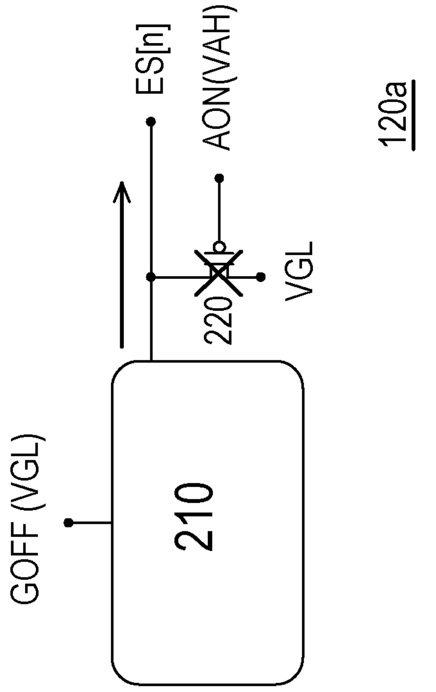
FIG. 2A is a circuit diagram of a light-emitting driving circuit according to an embodiment of the disclosure.

FIG. 2A and FIG. 2B are circuit diagrams of the light-emitting driving circuit according to an embodiment of the disclosure. In this embodiment, a light-emitting driving circuit 120*a* in FIG. 2A and FIG. 2B is an implementation of the light-emitting driving circuits 121 to 123 in FIG. 1, but the disclosure is not limited thereto. It should be noted that the light-emitting driving circuit 120*a* in FIG. 2A is in the driving mode, while the light-emitting driving circuit 120*a* in FIG. 2B is in the sensing mode.

First, please refer to FIG. 1 and FIG. 2A. The light-emitting driving circuit 120*a* includes a driving control circuit 210 and a driving all-on transistor 220. It should be noted that the combined effect of the driving control circuit 210 and the driving all-on transistor 220 is equivalent to the combined effect of the timing circuit CTC and the driving circuit CTD in FIG. 1. That is, the light-emitting driving circuit 120*a* is a simplified version of the light-emitting driving circuits 121 to 123. In this simplified version, the driving control circuit 210 includes most of the components of the light-emitting driving circuits 121 to 123, with only the driving all-on transistor 220 being separated from the light-emitting driving circuits 121 to 123.

The first end of the driving control circuit 210 is configured to receive a gate-off signal GOFF, and the second end of the driving control circuit 210 is coupled to the first end of the driving all-on transistor 220. The control end of the driving all-on transistor 220 is configured to receive an all-on signal AON, the first end of the driving all-on transistor 220 is configured to provide a light-emitting driving signal ES[n], and the second end of the driving all-on transistor 220 is configured to receive a gate enable level VGL.

It should be noted that the transistors in the light-emitting driving circuit 120*a* may use P-type transistors, so the enable level may be a low level, and the disable level may be a high level. However, the disclosure is not limited thereto.

In the driving mode, the gate-off signal GOFF may be at the enable level (such as VGL), and the all-on signal AON may be at the disable level (such as an all-on disable level VAH). As a result, the driving control circuit 210 is enabled, so that the value of the light-emitting driving signal ES[n] is determined by the operation result of the driving control circuit 210, and the light-emitting driving signal ES[n] is provided to the display module 110 to sequentially enable the pixels PX on the display module 110. On the other hand, the driving all-on transistor 220 is disabled, thus not affecting the light-emitting driving signal ES[n].

Next, please refer to FIG. 1 and FIG. 2B. In the sensing mode, the gate-off signal GOFF may be at the disable level (such as a gate disable level VGH), and the all-on signal AON may be at the enable level (such as the all-on enable level VAL). As a result, the driving all-on transistor 220 is enabled, so that the value of the light-emitting driving signal ES[n] is fixed at the enable level (that is, VAL), and the light-emitting driving signal ES[n] is provided to the display module 110 to simultaneously enable all pixels PX on the display module 110. On the other hand, the driving control circuit 210 is disabled, thus not affecting the light-emitting driving signal ES[n].

That is, in the sensing mode, the gate-off signal GOFF is at the disable level, and in the driving mode, the gate-off signal GOFF is at the enable level. Therefore, in the driving mode, the driving control circuit 210 is configured to perform the following. Based on the enabled gate-off signal GOFF and the disabled all-on signal AON, the driving all-on transistor 220 is disabled, so that the driving control circuit 210 (such as the driving circuit CTD responsible for outputting signals) directly outputs the first phase signal (such as one of P1 to P6) of the multiple phase signals as the light-emitting driving signal ES[n]. Also, in the sensing mode, the driving control circuit 210 is configured to perform the following. Based on the disabled gate-off signal GOFF and the enabled all-on signal AON, the driving all-on transistor 220 is enabled, so that the driving control circuit 210 directly outputs the enable level as the light-emitting driving signal ES[n].

Figure 3:
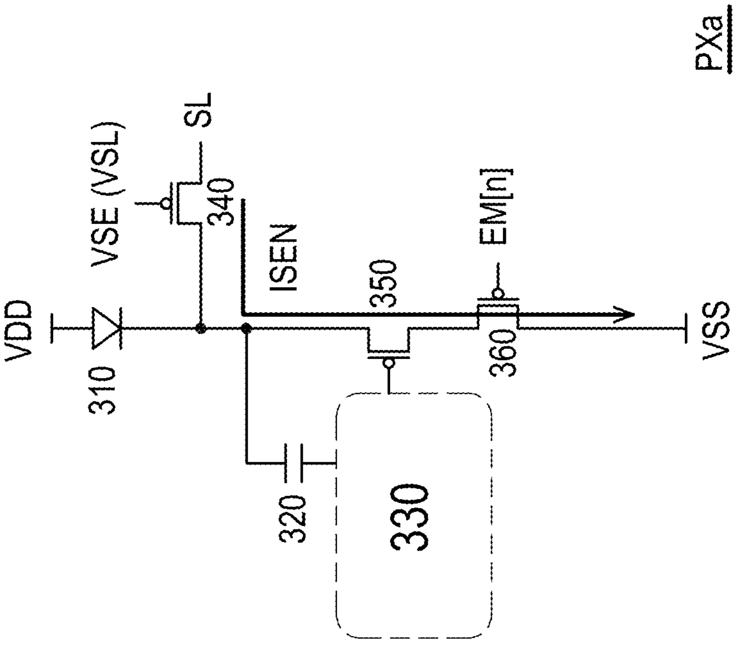
FIG. 3 is a circuit diagram of a pixel according to an embodiment of the disclosure.

FIG. 3 is a circuit diagram of a pixel according to an embodiment of the disclosure. Please refer to FIG. 1 and FIG. 3. In this embodiment, a pixel PXa in FIG. 3 is an implementation of the pixel PX in FIG. 1, but the disclosure is not limited thereto. It should be noted that the pixel PXa in FIG. 3 is in the sensing mode.

In this embodiment, the pixel PXa includes a light-emitting diode 310, a capacitor 320, a logic circuit 330, a switch transistor 340, a sensing transistor 350, and a light-emitting driving transistor 360. It is worth noting that the transistors T1 to T10 in FIG. 3 are exemplified as P-type transistors, but the disclosure is not limited thereto.

The light-emitting diode 310 includes an anode receiving a system high voltage VDD and a cathode. The capacitor 320 includes a first end coupled to the cathode of the light-emitting diode 310, and a second end. The logic circuit 330 includes a first end coupled to the second end of the capacitor 320, and a second end. The switch transistor 340 includes a first end coupled to the cathode of the light-emitting diode 310, a control end receiving a sensing activate voltage VSE, and a second end coupled to a sensing line SL. The sensing transistor 350 includes a first end coupled to the first end of the switch transistor 340, a control end coupled to the second end of the logic circuit 330, and a second end. The light-emitting driving transistor 360 includes a first end coupled to the second end of the sensing transistor 350, a control end receiving the light-emitting timing signal EM[n], and a second end receiving a system low voltage VSS.

In the sensing mode, the sensing activate voltage VSE may be at the enable level (such as VSL). Therefore, the switch transistor 340 is enabled, thereby coupling the sensing line SL to the cathode of the light-emitting diode 310. As a result, a sensing current ISEN flows through the sensing transistor 350, so that the sensing transistor 350 may sense the value of the sensing current ISEN. As a result, the brightness of the display module 110 may be adjusted to be uniform based on the value of the sensing current ISEN, thereby enhancing the user experience.

Figure 4:
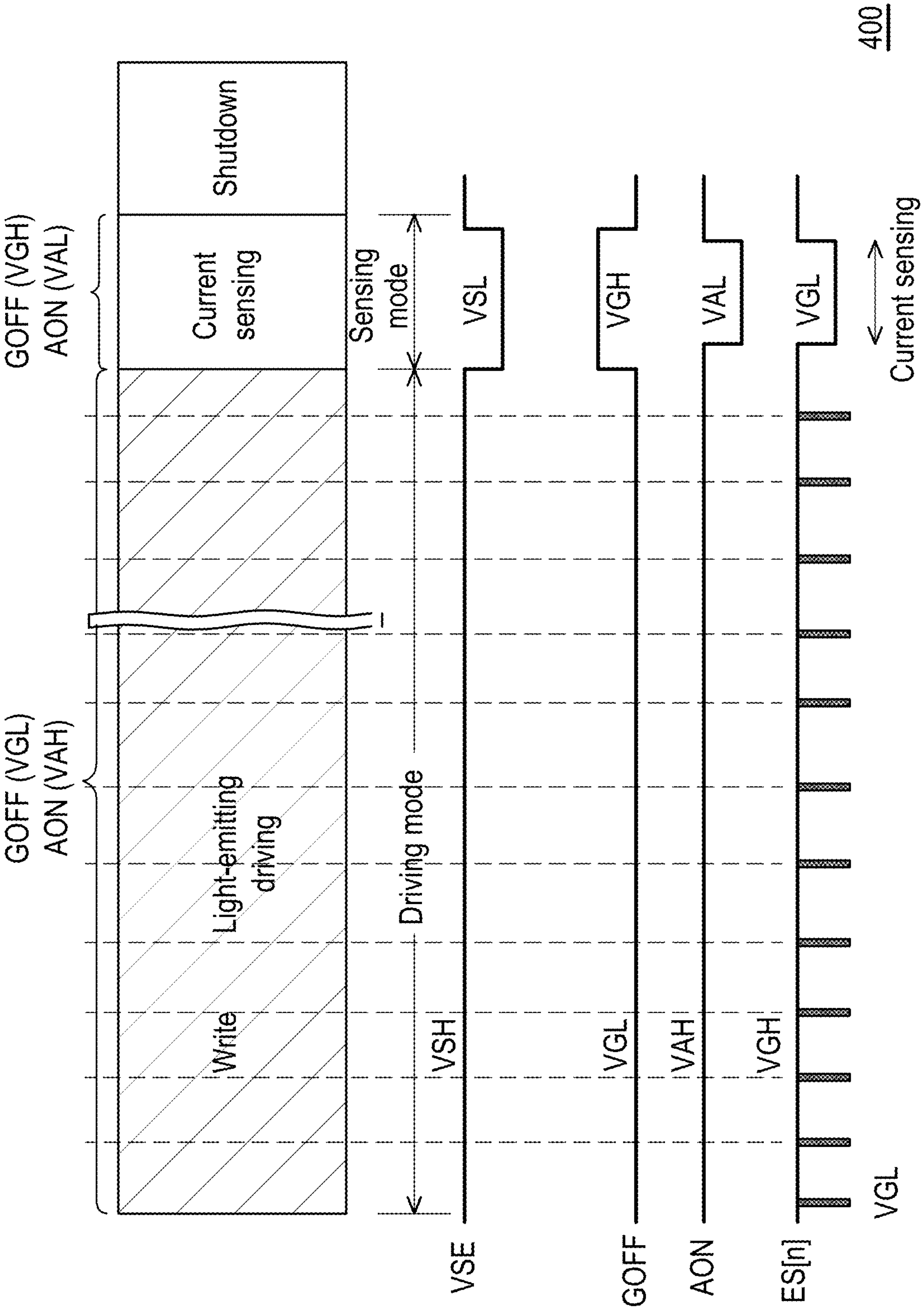
FIG. 4 is a driving timing diagram of the light-emitting driving circuit according to an embodiment of the disclosure.

FIG. 4 is a driving timing diagram of the light-emitting driving circuit according to an embodiment of the disclosure. Please refer to FIG. 1 to FIG. 3. FIG. 4 is an implementation of the driving timing of the light-emitting driving circuits 121 to 123, the pixel PX in FIG. 1, the light-emitting driving circuit 120*a* in FIG. 2, and/or the pixel PXa in FIG. 3, but the disclosure is not limited thereto. In this embodiment, a timing diagram 400 includes three stages, a write and light-emitting driving stage (that is, a period of the driving mode), a current sensing stage (that is, a period of the sensing mode), and a shutdown stage. Moreover, the signals presented in the timing diagram 400 may include the sensing activate voltage VSE, the gate-off signal GOFF, the all-on signal AON, and the light-emitting driving signal ES[n].

First, in the write and driving stage, the sensing activate voltage VSE may be at the disable level (such as the sensing disable level VSH), the gate-off signal GOFF may be at the enable level (such as VGL), the all-on signal AON may be at the disable level (such as VAH), and the light-emitting driving signal ES[n] may be a pulse signal that periodically switches between the enable level (such as VGL) and the disable level (such as VGH). As a result, the light-emitting driving circuits 121 to 123 enter the driving mode and sequentially enable the pixels PX on the display module 110.

Next, in the current sensing stage, the sensing activate voltage VSE may be at the enable level (such as the sensing enable level VSL), the gate-off signal GOFF may be at the disable level (such as VGH), the all-on signal AON may be at the enable level (such as VAL), and the light-emitting driving signal ES[n] may be at the enable level (such as VGL). As a result, the light-emitting driving circuits 121 to 123 enter the sensing mode and simultaneously enable the pixels PX on the display module 110.

Finally, in the shutdown stage, the levels of the signals may be switched to the levels before the current sensing stage, thereby restoring the previous changes to prepare for the next power-on/display operation.

It is worth noting that the current sensing stage is set before the shutdown stage. That is, the sensing mode of the light-emitting driving circuits 121 to 123 is configured to proceed before shutdown. In other words, every time the apparatus is shut down, the display apparatus 100 automatically calibrates the display module 110 to avoid brightness non-uniformity issues. Furthermore, since the current sensing stage is entered after the normal write and light-emitting driving stage has ended, the brightness can be adjusted to be uniform without affecting the user experience.

Figure 5A:
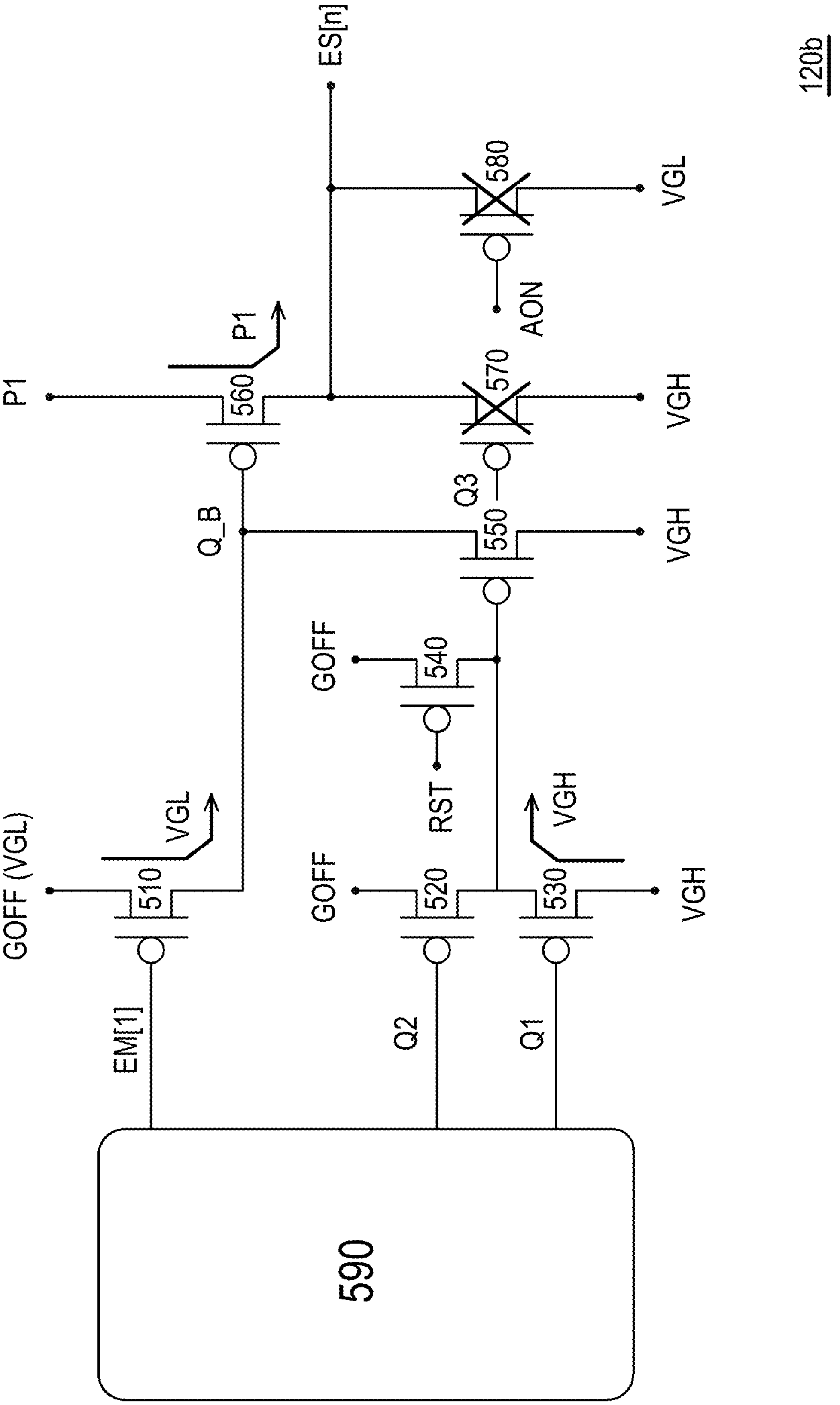
FIG. 5A is a circuit diagram of the light-emitting driving circuit according to an embodiment of the disclosure.
Figure 5B:
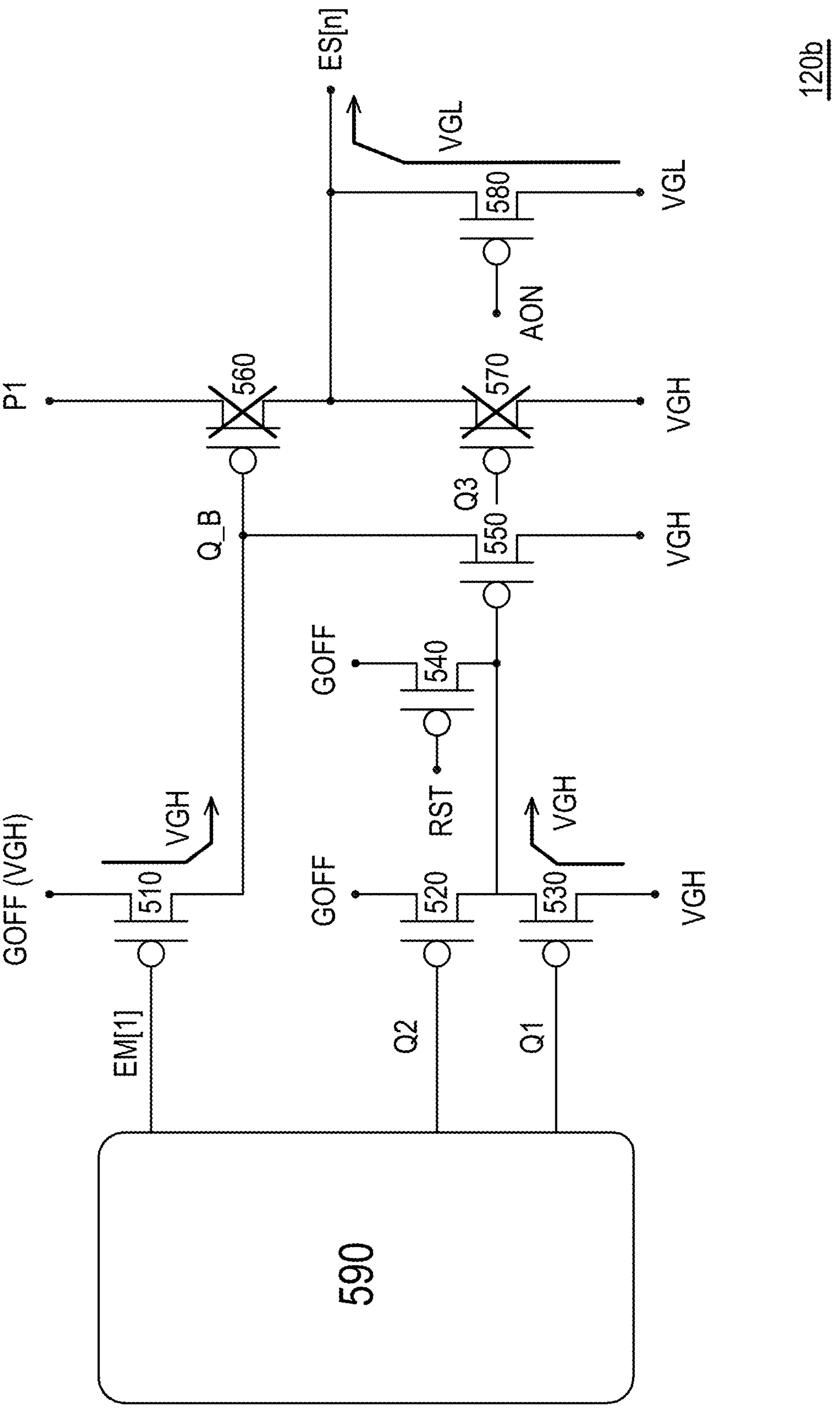
FIG. 5B is a circuit diagram of the light-emitting driving circuit according to an embodiment of the disclosure.
Figure 5C:
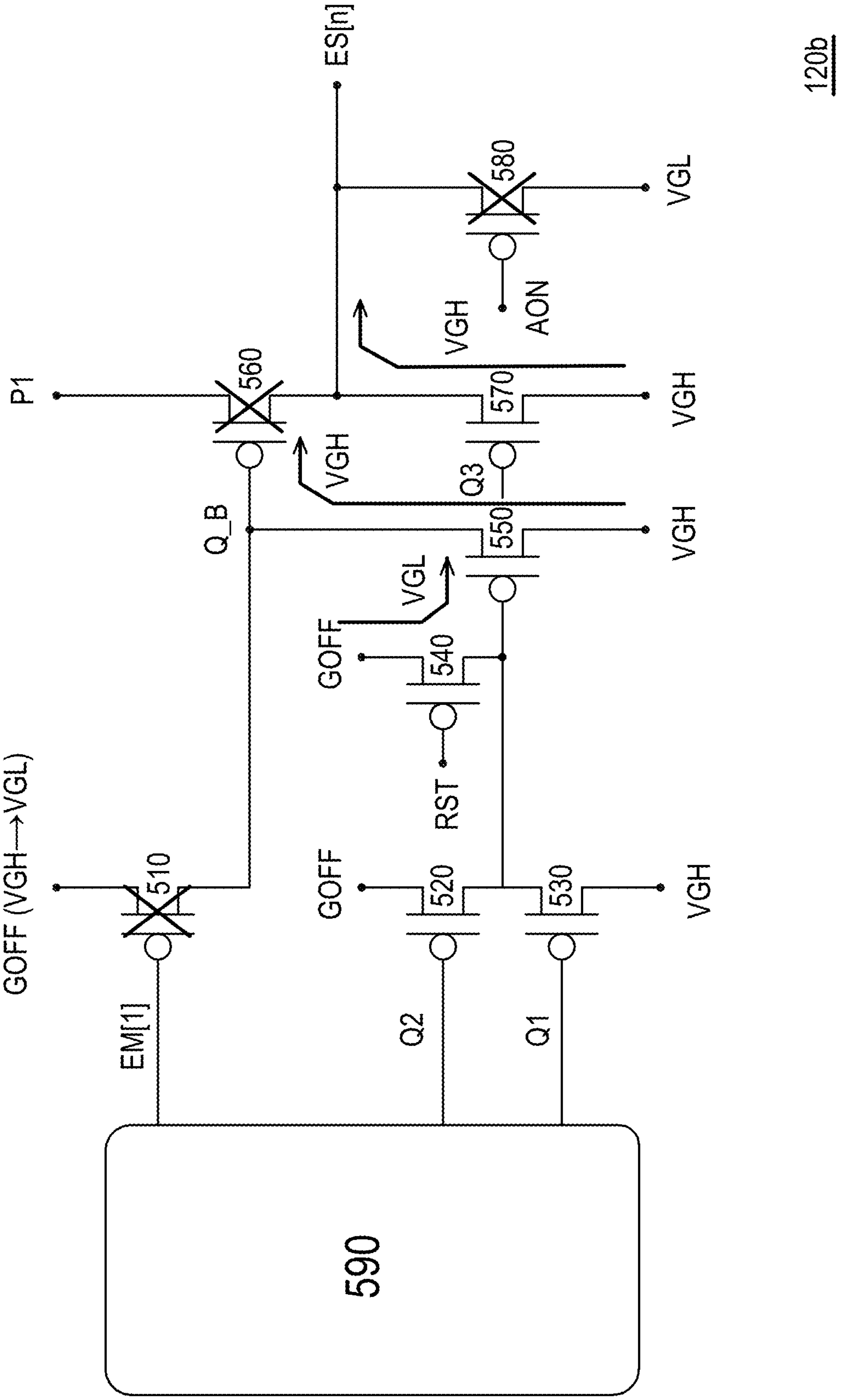
FIG. 5C is a circuit diagram of the light-emitting driving circuit according to an embodiment of the disclosure.

FIG. 5A to FIG. 5C are circuit diagrams of the light-emitting driving circuit according to an embodiment of the disclosure. Please refer to FIG. 1, FIG. 2A to FIG. 2B, and FIG. 5A to FIG. 5C. In this embodiment, a light-emitting driving circuit 120*b* in FIG. 5A to FIG. 5C is an implementation of the light-emitting driving circuits 121 to 123 in FIG. 1 and/or the light-emitting driving circuit 120*a* in FIG. 2A to FIG. 2B, but the disclosure is not limited thereto. It should be noted that the light-emitting driving circuit 120*b* in FIG. 5A is in the driving mode, the light-emitting driving circuit 120*a* in FIG. 5B is in a state about to start the sensing mode, and the light-emitting driving circuit 120*a* in FIG. 5C is in a state about to end the sensing mode.

First, please refer to FIG. 1 and FIG. 5A. The light-emitting driving circuit 120*b* includes a timing control circuit 590 and transistors 510 to 580. It should be noted that the combined effect of the timing control circuit 590 and the transistors 510 to 580 is equivalent to the combined effect of the timing circuit CTC and the driving circuit CTD in FIG. 1. That is, the light-emitting driving circuit 120*b* is an implementation of the light-emitting driving circuits 121 to 123, but the disclosure is not limited thereto. It is worth noting that the transistors 510 to 580 in FIG. 5A to FIG. 5C are exemplified by P-type transistors, but the disclosure is not limited thereto.

The timing control circuit 590 includes a first end providing a light-emitting timing signal EM[1], a second end providing an internal voltage Q2, and a third end providing an internal voltage Q1 (corresponding to the internal voltage Q). The transistor 510 includes a first end receiving a gate-off signal GOFF, a control end coupled to the first end of the timing control circuit 590, and a second end. The transistor 520 includes a first end receiving the gate-off signal GOFF, a control end coupled to the second end of the timing control circuit 590, and a second end providing an internal voltage Q_B. The transistor 530 includes a first end coupled to the second end of the transistor 520, a control end coupled to the third end of the timing control circuit 590, and a second end receiving a gate disable level VGH.

The transistor 540 includes a first end receiving the gate-off signal GOFF, a control end receiving a reset signal RST, and a second end coupled to the first end of the transistor 530 and used for providing an internal voltage Q3. The transistor 550 includes a first end coupled to the second end of the transistor 510, a control end coupled to the second end of the transistor 540, and a second end receiving the gate disable level VGH.

The transistor 560 includes a first end receiving a phase signal P1, a control end coupled to the first end of the transistor 550, and a second end providing a light-emitting driving signal ES[n]. The transistor 570 includes a first end coupled to the second end of the transistor 560, a control end coupled to the second end of the transistor 540, and a second end receiving the gate disable level VGH. The transistor 580 includes a first end coupled to the first end of the transistor 570, a control end receiving an all-on signal AON, and a second end receiving a gate enable level VGL.

In the driving mode, the gate-off signal GOFF may be at an enable level (such as VGL), the all-on signal AON may be at a disable level (such as VAH), the reset signal RST may be at a disable level (such as VGH), and the light-emitting timing signal may be at an enable level. Therefore, the transistor 510 is enabled, thereby providing the gate enable level VGL to the control end of the transistor 560, thus enabling the transistor 560. Also, the transistor 530 is enabled by the internal voltage Q1, thereby providing the gate disable level VGH to the control end of the transistor 550 and the control end of the transistor 570, thus disabling the transistor 550 and the transistor 570. Additionally, the transistor 540 is disabled, and the transistor 580 is disabled. As a result, the light-emitting driving circuit 120*b* directly outputs the received phase signal P1 as the corresponding light-emitting driving signal ES[n], thereby sequentially enabling the pixels PX on the display module 110.

Next, please refer to FIG. 1 and FIG. 5B. When about to start the sensing mode, the gate-off signal GOFF may be at a disable level (such as VGH), the all-on signal AON may be at an enable level (such as VAL), the reset signal RST may be at an enable level (such as VGL), and the light-emitting timing signal may be at an enable level. Therefore, the transistor 510 is enabled, thereby providing the gate disable level VGH to the control end of the transistor 560, thus disabling the transistor 560. Also, the transistor 530 is enabled by the internal voltage Q1, thereby providing the gate disable level VGH to the control end of the transistor 550 and the control end of the transistor 570, thus disabling the transistor 550 and the transistor 570. Additionally, the transistor 540 is enabled, and the transistor 580 is enabled. As a result, the light-emitting driving circuit 120*b* directly outputs the gate enable level VGL as the corresponding light-emitting driving signal ES[n], thereby simultaneously enabling the pixels PX on the display module 110.

Finally, please refer to FIG. 5C. When about to end the sensing mode, the gate-off signal GOFF may switch from a disable level (such as VGH) to an enable level (such as VGL), the all-on signal AON may switch from an enable level (such as VAL) to a disable level (such as VAH), the reset signal RST may switch from an enable level (such as VGL) to a disable level (such as VGH), and the light-emitting timing signal may be at a disable level. Therefore, the transistor 510 is disabled. Also, the transistor 540 is enabled, thereby providing the gate enable level VGL to the control end of the transistor 550 and the control end of the transistor 570, thus enabling the transistor 550 and the transistor 570. The transistor 550 provides the gate disable level VGH to the control end of the transistor 560, thus disabling the transistor 560. The transistor 570 transfers the gate disable level VGH. As a result, the light-emitting driving circuit 120*b* directly outputs the gate disable level VGH as the corresponding light-emitting driving signal ES[n], thereby resetting the pixels PX on the display module 110.

Figure 6A:
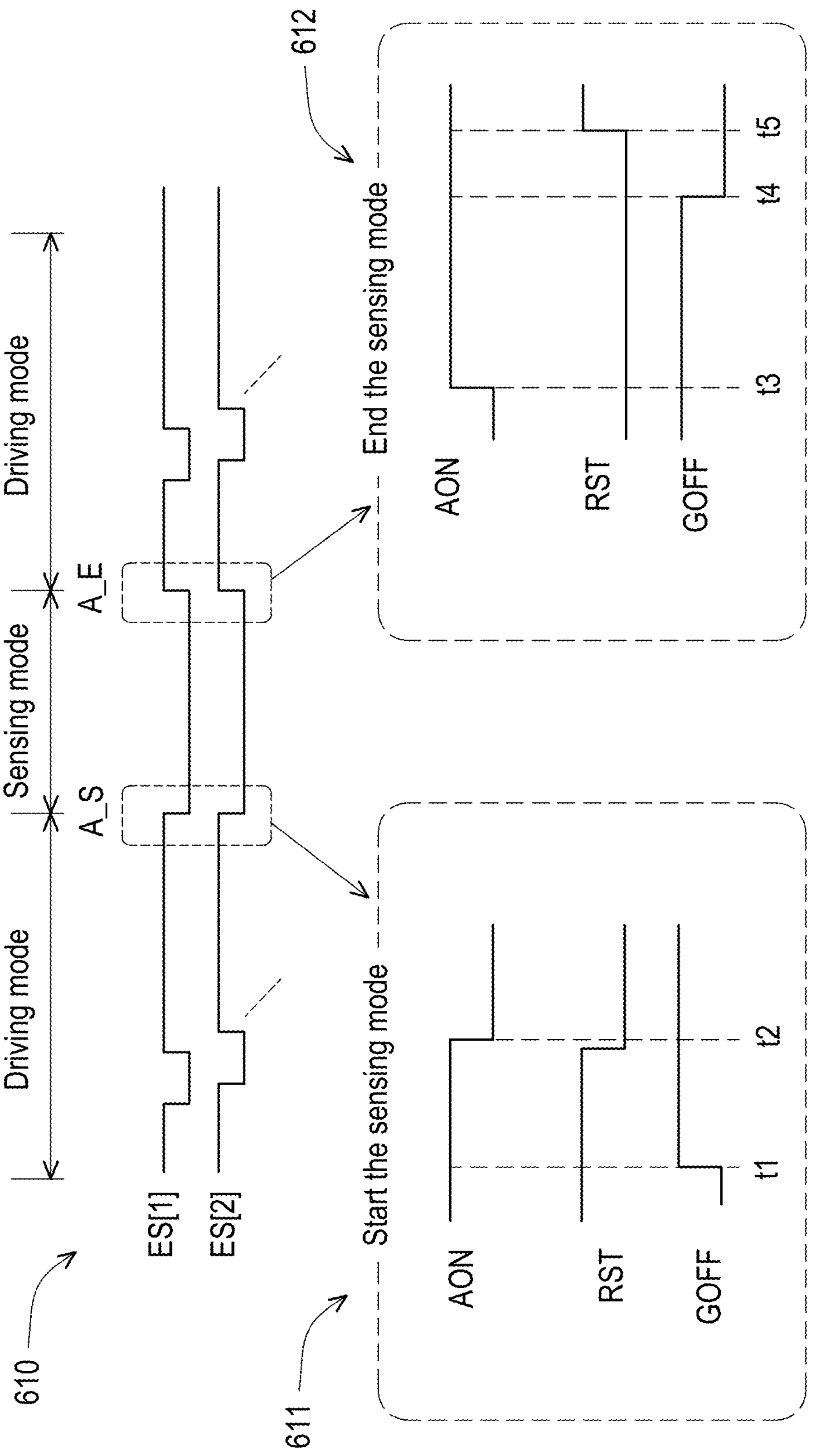
FIG. 6A is a driving timing diagram of the light-emitting driving circuit according to an embodiment of the disclosure.
Figure 6B:
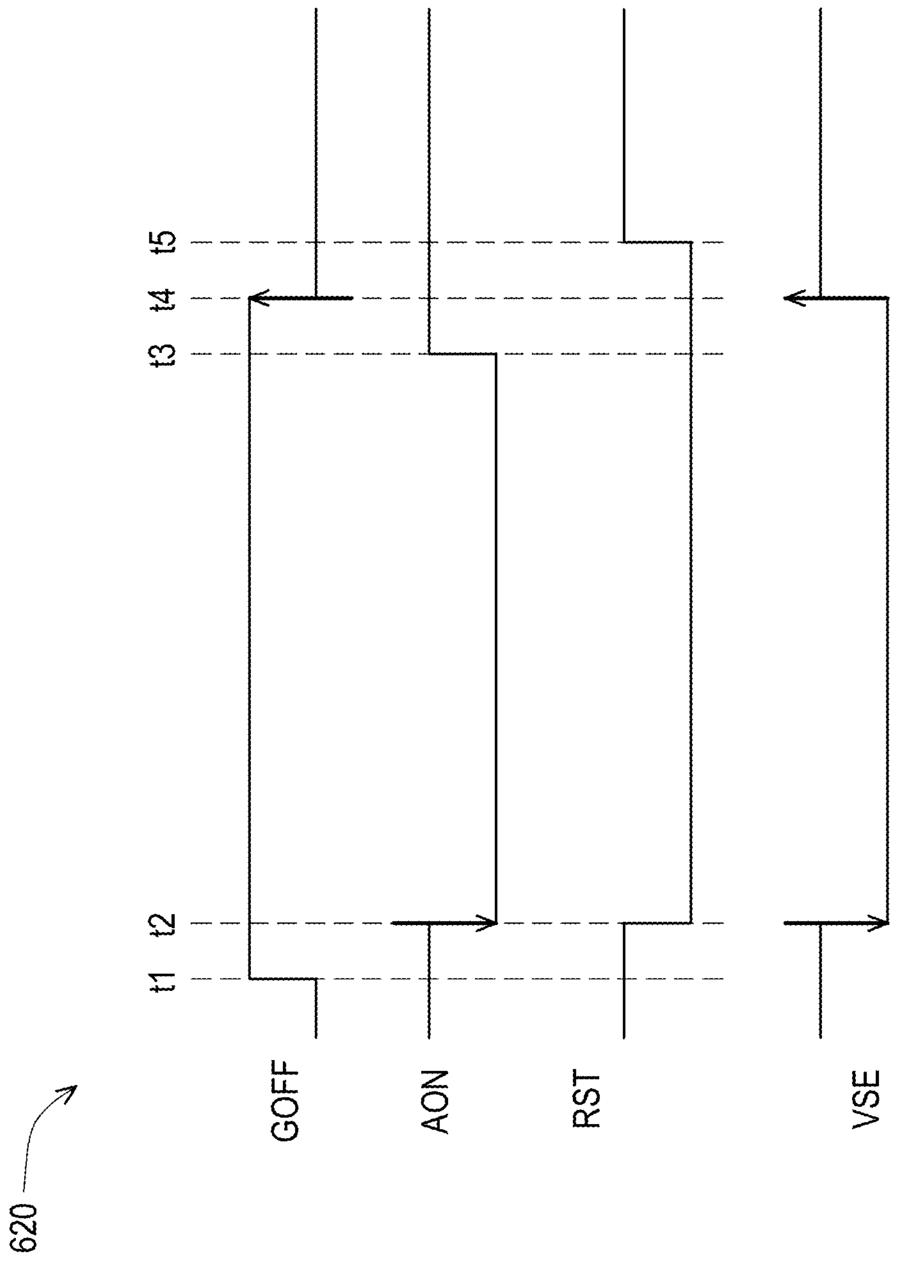
FIG. 6B is a driving timing diagram of the light-emitting driving circuit according to an embodiment of the disclosure.

FIG. 6A to FIG. 6B are schematic timing diagrams of the light-emitting driving circuit according to an embodiment of the disclosure. Please refer to FIG. 1 and FIG. 5A to FIG. 5C. FIG. 6A to FIG. 6B represent one implementation of the driving timing sequence of the light-emitting driving circuits 121 to 123 in FIG. 1 and/or the light-emitting driving circuit 120*b* in FIG. 5A to FIG. 5C, but the disclosure is not limited thereto. In this embodiment, the operation mode of the light-emitting driving circuit 120*b* may switch between a driving mode and a sensing mode. For example, the sensing mode may be configured to proceed between two driving modes.

FIG. 6A includes three parts, a timing diagram 610, a timing diagram 611, and a timing diagram 612. The timing diagram 611 and the timing diagram 612 respectively show the timing representation of various signals during an all-on start period A_S when starting the sensing mode and an all-on ending period A_E when ending the sensing mode.

First, please refer to the timing diagram 610. The timing diagram 610 shows the light-emitting driving signal ES[n] where the sensing mode is configured between two driving modes. During the period of the first driving mode, the light-emitting driving signal ES[n] may sequentially switch from a disable level (such as VGH) to an enable level (such as VGL), and then sequentially switch back from the enable level (such as VGL) to the disable level (such as VGH). As a result, the pixels PX on the display module 110 may be sequentially enabled.

After the end of the period of the first driving mode, during the all-on start period A_S when the sensing mode is about to start, the light-emitting driving signal ES[n] may simultaneously switch from the disable level (such as VGH) to the enable level (such as VGL). As a result, the pixels PX on the display module 110 may be simultaneously enabled. On the other hand, during the all-on ending period A_E when the sensing mode is about to end, the light-emitting driving signal ES[n] may simultaneously switch back from the enable level (such as VGL) to the disable level (such as VGH), thereby restoring the previous change to prepare for the upcoming second driving mode.

Specifically, please refer to the timing diagram 611 and the timing diagram 612. The timing diagram 611 and the timing diagram 612 respectively illustrate the timing representation of the all-on signal AON, the reset signal RST, and the gate-off signal GOFF during the all-on start period A_S and during the all-on ending period A_E.

It should be noted that, in one embodiment, the all-on signal AON, the reset signal RST, and the gate-off signal GOFF during the all-on start period A_S and/or the all-on ending period A_E may switch the peak values thereof synchronously. For example, during the all-on start period A_S, at the same time point, the all-on signal AON and the reset signal RST may switch from the disable level to the enable level, and the gate-off signal GOFF may switch from the enable level to the disable level. Similarly, during the all-on ending period A_E, at the same time point, the all-on signal AON and the reset signal RST may switch from the enable level to the disable level, and the gate-off signal GOFF may switch from the disable level to the enable level.

In this embodiment, the all-on signal AON, the reset signal RST, and the gate-off signal GOFF during the all-on ending period A_E may switch the peak values thereof asynchronously, thereby reducing mutual interference between signals and achieving better sensing effect and reset effect. Specifically, during the all-on start period A_S, at a time point t1, the gate-off signal GOFF may switch from the enable level to the disable level. Then, at a time point t2, the all-on signal AON and the reset signal RST may switch from the disable level to the enable level. On the other hand, during the all-on ending period A_E, at a time point t3, the all-on signal AON may switch from the enable level to the disable level. Then, at a time point t4, the gate-off signal GOFF may switch from the disable level to the enable level. Subsequently, at a time point t5, the reset signal RST may switch from the enable level to the disable level. That is, when the sensing mode is about to start, the gate-off signal GOFF switches the peak value thereof prior to the all-on signal AON and the reset signal RST. On the other hand, when the sensing mode is about to end, the all-on signal AON switches the peak value thereof prior to the gate-off signal GOFF, and the gate-off signal GOFF switches the peak value thereof prior to the reset signal RST. However, the disclosure is not limited thereto.

Next, please refer to FIG. 6B. A timing diagram 620 in FIG. 6B integrates the timing diagram 611 and the timing diagram 612 together, and further adds the timing representation of the sensing activate voltage VSE. For the sake of brevity, similar details will not be elaborated further.

During the all-on start period A_S, in order to sense the sensing current ISEN in the display module 110, the sensing activate voltage VSE may switch from the disable level to the enable level. Also, at the time point t2, the sensing activate voltage VSE and the all-on signal AON may switch synchronously from the disable level to the enable level, thereby sensing the sensing current ISEN as early as possible. On the other hand, during the all-on ending period A_E, after sensing the sensing current ISEN, the sensing activate voltage VSE may switch from the enable level to the disable level. Also, at the time point t4, the sensing activate voltage VSE may switch from the enable level to the disable level, and the gate-off signal GOFF may switch from the disable level to the enable level, thereby activating the driving mode of the display module 110 without any interval.

Figure 7:
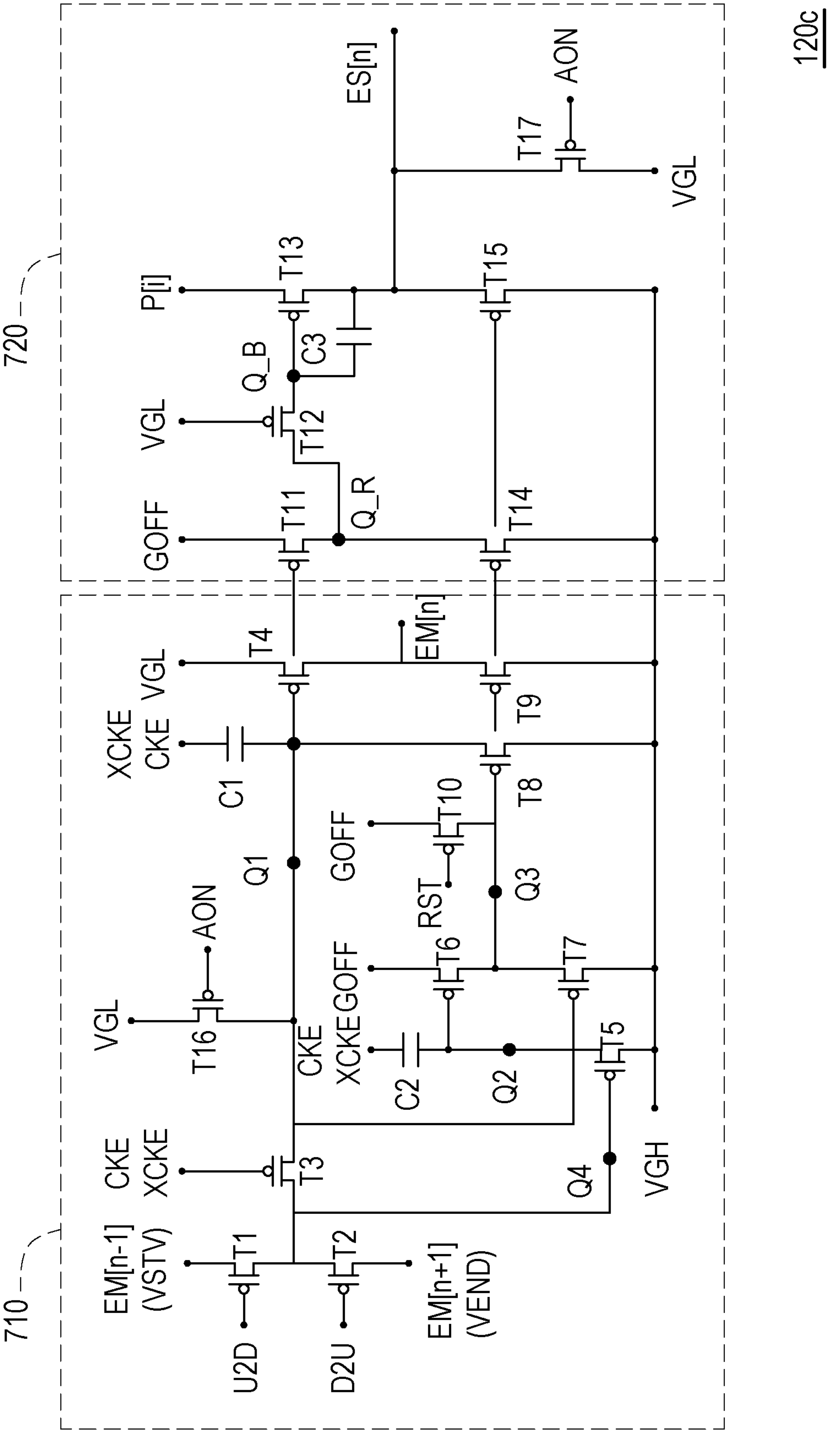
FIG. 7 is a circuit diagram of the light-emitting driving circuit according to an embodiment of the disclosure.

FIG. 7 is a circuit diagram of the light-emitting driving circuit according to an embodiment of the disclosure. Referring to FIG. 1, FIG. 2A to FIG. 2B, FIG. 5A to FIG. 5C, and FIG. 7, in this embodiment, a light-emitting driving circuit 120*c* in FIG. 7 is an implementation of the light-emitting driving circuits 121 to 123 in FIG. 1, the light-emitting driving circuit 120*a* in FIG. 2A to FIG. 2B, and/or the light-emitting driving circuit 120*b* in FIG. 5A to FIG. 5C, but the disclosure is not limited thereto. The light-emitting driving circuit 120*c* may include a timing circuit 710 and a driving circuit 720, and the timing circuit 710 and the driving circuit 720 are respectively implementations of the timing circuit CTC and the driving circuit CTD, but the disclosure is not limited thereto.

The timing circuit 710 includes transistors T1 to T10 (corresponding to a first transistor to a tenth transistor), a transistor T16 (corresponding to a timing all-on transistor), a first capacitor C1, and a second capacitor C2. It should be noted that the transistors T1 to T10 and the transistor T16 are exemplified as P-type transistors, but the disclosure is not limited thereto.

The transistor T1 includes a first end receiving the previous light-emitting timing signal EM[n−1] or the light-emitting start signal VSTV, a control end receiving a first direction scan signal U2D, and a second end coupled to an internal voltage Q4, where n is a positive integer. The transistor T2 includes a first end coupled to the second end of transistor T1, a control end receiving a second direction scan signal D2U, and a second end receiving the latter light-emitting timing signal EM[n+1] or a light-emitting end signal VEND. The transistor T3 includes a first end coupled to the second end of the transistor T1, a control end receiving one of the clock signals CK and XCK (corresponding to the first clock signal), and a second end coupled to the internal voltage Q1 (corresponding to the internal voltage Q).

The transistor T4 includes a first end receiving the gate enable level VGL, a control end receiving the internal voltage Q1, and a second end providing the light-emitting timing signal EM[n]. The first capacitor C1 is coupled between the other one of the clock signals CKE and XCKE (corresponding to the second clock signal) and the control end of transistor T4. The transistor T5 includes a first end coupled to internal voltage Q2 (that is, the second end of the transistor T1), a control end coupled to the second end of the transistor T1, and a second end receiving the gate disable level VGH, where the gate disable level VGH may be higher than the gate enable level, but the disclosure is not limited thereto, as this depends on the circuit design.

The second capacitor C2 is coupled between one of the clock signals CKE and XCKE and the first end of transistor T5. The transistor T6 includes a first end receiving the gate-off signal GOFF, a control end coupled to the first end of transistor T5, and a second end coupled to the internal voltage Q3. The transistor T7 includes a first end coupled to the second end of the transistor T6, a control end receiving the internal voltage Q1, and a second end receiving the gate disable level VGH.

The transistor T8 includes a first end receiving the internal voltage Q1, a control end coupled to the second end of the transistor T6, and a second end receiving the gate disable level VGH. The transistor T9 includes a first end coupled to the second end of the transistor T4, a control end coupled to the second end of the transistor T6, and a second end receiving the gate disable level VGH. The transistor T10 includes a first end receiving the gate-off signal GOFF, a control end receiving the reset signal RST, and a second end coupled to the second end of the transistor T6.

The transistor T16 includes a first end receiving the gate enable level VGL, a control end receiving the all-on signal AON, and a second end coupled to the internal voltage Q1. It is worth noting that, in the driving mode, the transistor T16 may be disabled based on the disabled all-on signal AON, thereby allowing the timing circuit 710 to output the corresponding light-emitting timing signal EM[n] based on the previous light-emitting timing signal EM[n−1]. On the other hand, in the sensing mode, the transistor T16 may be enabled based on the enabled all-on signal AON to provide the gate enable level VGL to the transistor T4, thereby enabling the transistor T4. The enabled transistor T4 directly outputs the gate enable level VGL as the light-emitting timing signal EM[n].

In this embodiment, the driving circuit 720 includes transistors T11 to T15 (corresponding to the eleventh transistor to the fifteenth transistor), the transistor T17 (corresponding to the driving all-on transistor), and the third capacitor C3. It should be noted that the transistors T11 to T15 and the transistor T17 are exemplified as P-type transistors, but the disclosure is not limited thereto. Additionally, the transistor T17 has a function similar to the driving all-on transistor 220 in FIG. 2A and FIG. 2B.

The transistor T11 includes a first end receiving the gate-off signal GOFF, a control end receiving the internal voltage Q1, and a second end coupled to an internal voltage Q_R. The transistor T12 includes a first end coupled to the second end of transistor T11, a control end receiving the gate enable level VGL, and a second end coupled to the internal voltage Q_B. The transistor T13 includes a first end receiving the phase signal P[i] (that is, one of the phase signals P1 to P6), a control end coupled to the second end of the transistor T12, and a second end providing the light-emitting driving signal ES[n]. The third capacitor C3 is coupled between the control end of the transistor T13 and the second end of the transistor T13.

The transistor T14 includes a first end coupled to the second end of the transistor T11, a control end coupled to the second end of the transistor T6, and a second end receiving the gate disable level VGH. The transistor T15 includes a first end coupled to the second end of the transistor T13, a control end coupled to the second end of the transistor T6, and a second end receiving the gate disable level VGH.

The transistor T17 includes a first end coupled to the first end of the transistor T15, a control end receiving the all-on signal AON, and a second end receiving the gate enable level VGL. It is worth noting that, in the driving mode, transistor T17 may be disabled based on the disabled all-on signal AON, thereby allowing the driving circuit 720 to output the corresponding light-emitting driving signal ES[n] based on the phase signal P[i]. On the other hand, in the sensing mode, the transistor T17 may be enabled based on the enabled all-on signal AON, thereby directly outputting the gate enable level VGL as the light-emitting driving signal ES[n].

Figure 8:
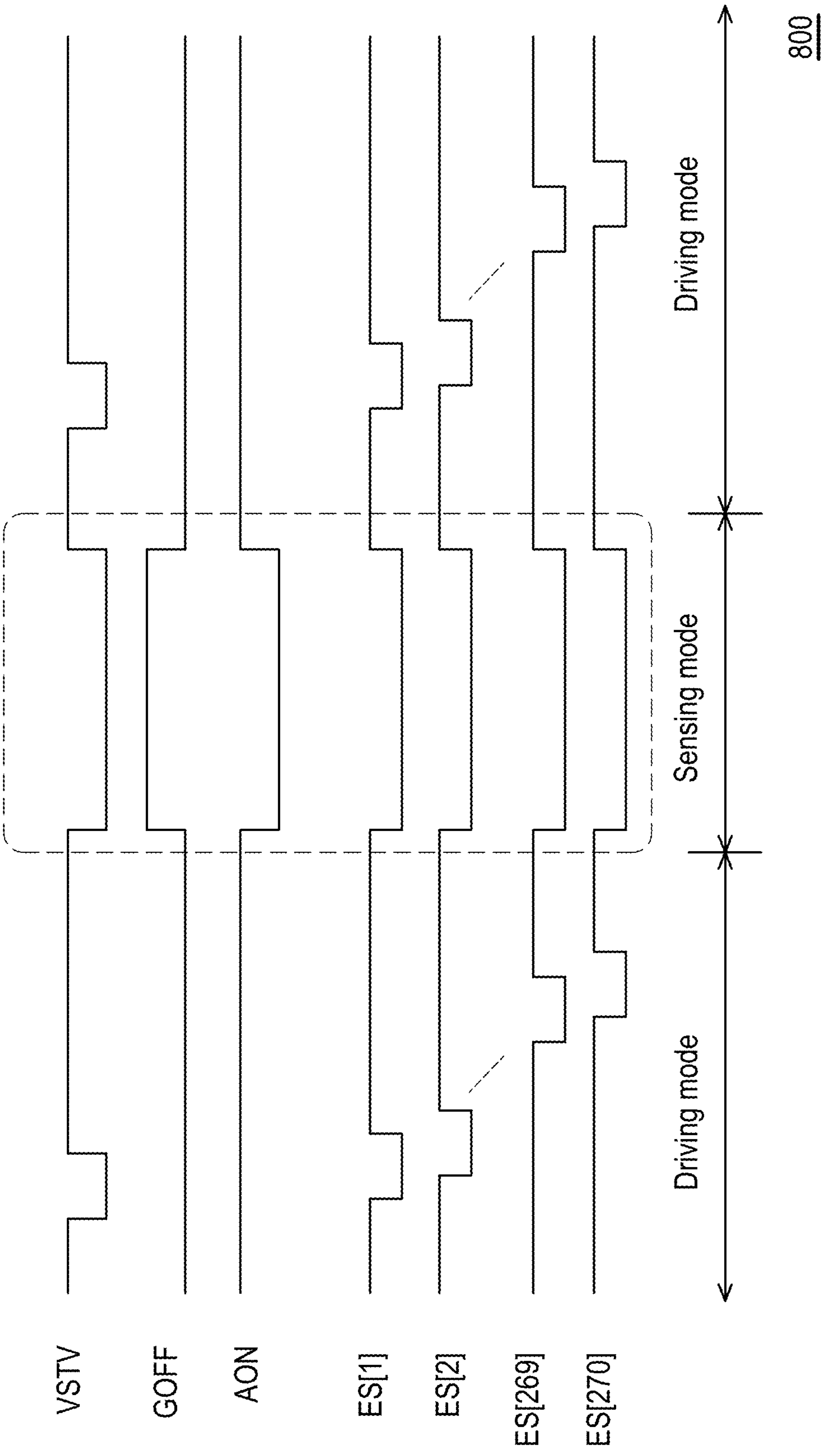
FIG. 8 is a driving timing diagram of the light-emitting driving circuit according to an embodiment of the disclosure.

FIG. 8 is a schematic timing diagram of the light-emitting driving circuit according to an embodiment of the disclosure. Please refer to FIG. 1 and FIG. 8. A timing diagram 800 is an implementation of the driving timing sequence of the light-emitting driving circuits 121 to 123 in FIG. 1, the light-emitting driving circuit **120*b* in FIG. 5A to FIG. 5C, and/or the light-emitting driving circuit 120*c* in FIG. 7, but the disclosure is not limited thereto. In this embodiment, the operation mode of the light-emitting driving circuit 120*c*** may switch between the driving mode and the sensing mode. For example, the sensing mode may be configured to proceed between two driving modes.

During the period of the first driving mode, based on the time point of the light-emitting start signal VSTV at the enable level, the gate-off signal GOFF maintained at the enable level, and the all-on signal AON maintained at the disable level, the light-emitting driving signals ES[1 to 270] may sequentially switch from the disable level (such as VGH) to the enable level (such as VGL), and then sequentially switch back from the enable level (such as VGL) to the disable level (such as VGH). In this way, the pixels PX on the display module 110 may be sequentially enabled.

During the period of the sensing mode, based on the light-emitting driving signal ES[n] maintained at the enable level, the gate-off signal GOFF maintained at the disable level, and the all-on signal AON maintained at the enable level, the light-emitting driving signals ES[1 to 270] may all be maintained at the enable level. In this way, the pixels PX on the display module 110 may be simultaneously enabled.

It is worth noting that, although the light-emitting start signal VSTV, the gate-off signal GOFF, the all-on signal AON, and the light-emitting driving signals ES[1 to 270] shown in the timing diagram 800 switch the peak values thereof at the same time, as described in FIG. 6A and FIG. 6B, in order to reduce interference between signals and increase the efficiency of the driving mode and the sensing mode, these signals may switch the peak values thereof asynchronously.

Additionally, the operation during the period of the second driving mode may refer to the above description regarding the period of the first driving mode, so details will not be repeated here. Moreover, the technical details related to the timing configuration of the sensing mode and the driving mode may refer to the description in FIG. 6A and FIG. 6B.

Figure 10:
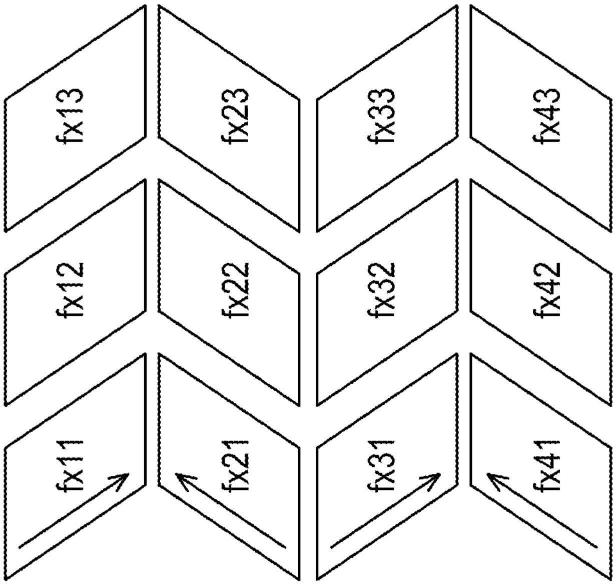
FIG. 10 is a scan timing diagram of the display module according to an embodiment of the disclosure.
Figure 9:
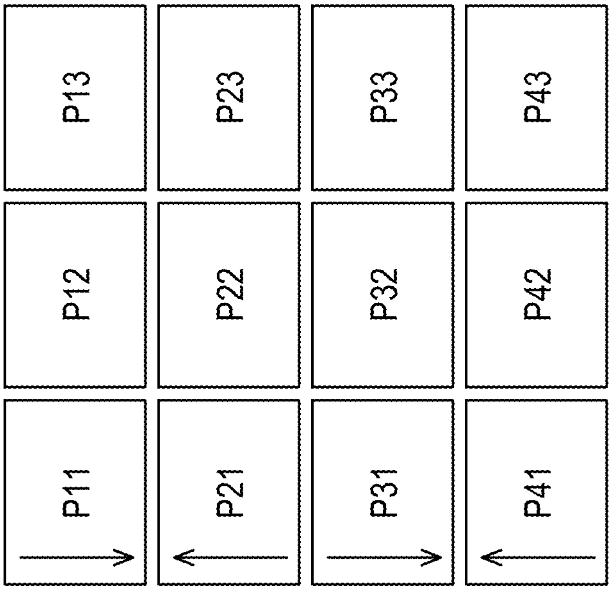
FIG. 9 is a system diagram of a display module according to an embodiment of the disclosure.

FIG. 9 is a system diagram of a display module according to an embodiment of the disclosure. FIG. 10 is a scan timing diagram of the display module according to an embodiment of the disclosure. Referring to FIG. 1, FIG. 9, and FIG. 10, in this embodiment, the display module 110 includes multiple display panels P11 to P43 arranged in an array, as shown by frame scan timing sequences fx11 to fx43, the scan direction of the display panels P11 to P43 in odd-numbered rows is different from the scan direction of the display panels P11 to P43 in even-numbered rows. For example, the display panels P11 to P13 and P31 to P33 in odd-numbered rows may scan images (that is, display images) from top to bottom (also referred to as forward scanning), while the display panels P21 to P23 and P41 to P43 in even-numbered rows may scan images from bottom to top (also referred to as reverse scanning), so that there will be no significant image breakage at the boundaries of the display panels P11 to P43, thereby improving the jagged screen condition. However, the disclosure is not limited thereto.

Additionally, in order to improve the brightness uniformity of the display module 110 formed by the multiple display panels P11 to P43 being tiled, the light-emitting driving circuits 121 to 123 may, in the sensing mode, detect multiple brightness levels of the multiple display panels P11 to P43. Furthermore, the light-emitting driving circuits 121 to 123 may adjust the multiple brightness levels of the multiple display panels P11 to P43 based on the brightness differences between the detected multiple brightness levels of the multiple display panels P11 to P43, thereby achieving consistency among the multiple brightness levels of the multiple display panels P11 to P43.

In other words, the light-emitting driving circuits 121 to 123 may be configured to perform the following. A first sensing current (such as the sensing current ISEN of the display panel P11) of a first display panel (such as the display panel P11) among the multiple display panels P11 to P43 and a second sensing current (such as the sensing current ISEN of the display panel P12) of a second display panel (such as the display panel P12) among the multiple display panels are sensed, so as to determine a first brightness of the first display panel and a second brightness of the second display panel. Furthermore, the light-emitting driving circuits 121 to 123 may be configured to perform the following. The first brightness and/or the second brightness is adjusted based on a brightness difference between the first brightness and the second brightness, so that the first brightness equals the second brightness. In this way, the brightness of the tiled screen can be displayed uniformly, thereby enhancing the user experience.

In summary, in the display apparatus of this disclosure, the operation mode of the display module may be divided into two modes, the driving mode and the sensing mode. In the driving mode, the light-emitting driving circuit sequentially illuminates pixels, thereby displaying various different contents. On the other hand, in the sensing mode, the light-emitting driving circuit simultaneously illuminates the pixels, thereby adjusting the brightness of the pixels or the panel to which the pixels belong through the value of the sensing current. In this way, the operation mode of the display module may be operated between the driving mode and the sensing mode according to requirements, and the brightness of the display module can be displayed uniformly, thereby enhancing the user experience.

Although the disclosure has been disclosed in the embodiments as above, the embodiments are not intended to limit the disclosure. Persons with ordinary knowledge in the relevant technical field may make some changes and modifications without departing from the spirit and scope of the disclosure. Therefore, the protection scope of the disclosure should be defined by the appended claims.

What is claimed is:

1. A display apparatus, comprising:

a display module comprising a plurality of pixels arranged in an array; and a plurality of light-emitting driving circuits, wherein each of the light-emitting driving circuits comprises:

a timing circuit receiving a plurality of clock signals and a previous light-emitting timing signal to provide a light-emitting timing signal and an internal voltage; and a driving circuit receiving a plurality of phase signals, an all-on signal, and the internal voltage to provide a plurality of light-emitting driving signals to the pixels respectively, thereby enabling the pixels, wherein the driving circuit is further configured to:

in a driving mode, based on the phase signals, sequentially enable the light-emitting driving signals, thereby sequentially enabling the pixels, and in a sensing mode, based on the all-on signal, simultaneously enable the plurality of light-emitting driving signals, thereby simultaneously enabling the pixels.

2. The display apparatus as claimed in claim 1, wherein the all-on signal in the sensing mode is at an enable level, and the all-on signal in the driving mode is at a disable level.

3. The display apparatus as claimed in claim 1, wherein in the driving mode, the driving circuit directly outputs a first phase signal of the phase signals as a light-emitting driving signal, and in the sensing mode, the driving circuit directly outputs an enable level as the light-emitting driving signal.

4. The display apparatus as claimed in claim 1, wherein each of driving circuits comprises a driving all-on transistor, and the driving circuit is further configured to:

in the driving mode, disable the driving all-on transistor based on an enabled gate-off signal and a disabled all-on signal, thereby causing the driving circuit to directly output a first phase signal of the phase signals as the light-emitting driving signal; and in the sensing mode, enable the driving all-on transistor based on a disabled gate-off signal and an enabled all-on signal, thereby causing the driving all-on transistor to directly output an enable level as a light-emitting driving signal.

5. The display apparatus as claimed in claim 4, wherein the gate-off signal in the sensing mode is at a disable level, and the gate-off signal in the driving mode is at an enable level.

6. The display apparatus as claimed in claim 4, wherein the all-on signal and the gate-off signal switch peak values synchronously.

7. The display apparatus as claimed in claim 4, wherein the all-on signal and the gate-off signal switch peak values asynchronously.

8. The display apparatus as claimed in claim 4, wherein in response to the sensing mode being about to start, the gate-off signal switches a peak value prior to the all-on signal, and in response to the sensing mode being about to end, the all-on signal switches the peak value prior to the gate-off signal.

9. The display apparatus as claimed in claim 1, wherein the sensing mode is configured to proceed before shutdown.

10. The display apparatus as claimed in claim 1, wherein the sensing mode is configured to proceed between two driving modes.

11. The display apparatus as claimed in claim 1, wherein the display module comprises:

a plurality of display panels arranged in an array, wherein a scan direction of the display panels in odd-numbered rows is different from a scan direction of the display panels in even-numbered rows.

12. The display apparatus as claimed in claim 1, wherein the display module comprises:

a plurality of display panels arranged in an array, and the light-emitting driving circuit is configured to:

sense a first sensing current of a first display panel among the display panels and a second sensing current of a second display panel among the display panels, so as to determine a first brightness of the first display panel and a second brightness of the second display panel; and adjust the first brightness and/or the second brightness based on a brightness difference between the first brightness and the second brightness, so that the first brightness equals the second brightness.

13. The display apparatus as claimed in claim 1, wherein the pixel comprises:

a light-emitting diode comprising an anode receiving a system high voltage, and a cathode;

a capacitor comprising a first end coupled to the cathode of the light-emitting diode, and a second end;

a logic circuit comprising a first end coupled to the second end of the capacitor, and a second end;

a switch transistor comprising a first end coupled to the cathode of the light-emitting diode, a control end receiving a sensing activate voltage, and a second end coupled to a sensing line;

a sensing transistor comprising a first end coupled to the first end of the switch transistor, a control end coupled to the second end of the logic circuit, and a second end;

a light-emitting driving transistor comprising a first end coupled to the second end of the sensing transistor, a control end receiving the light-emitting timing signal, and a second end receiving a system low voltage.

14. A display apparatus, comprising:

a display module;

a plurality of light-emitting driving circuits coupled to the display module, wherein each of the light-emitting driving circuits comprises a timing circuit, and the timing circuit comprises:

a first transistor comprising a first end receiving a previous light-emitting timing signal, a control end receiving a first direction scan signal, and a second end;

a second transistor comprising a first end coupled to the second end of the first transistor, a control end receiving a second direction scan signal, and a second end receiving a latter light-emitting timing signal;

a third transistor comprising a first end coupled to the second end of the first transistor, a control end receiving a first clock signal, and a second end coupled to an internal voltage;

a fourth transistor comprising a first end receiving a gate enable level, a control end receiving the internal voltage, and a second end providing a light-emitting timing signal;

a first capacitor coupled between a second clock signal and the control end of the fourth transistor;

a fifth transistor comprising a first end, a control end coupled to the second end of the first transistor, and a second end receiving a gate disable level;

a second capacitor coupled between the first clock signal and the first end of the fifth transistor;

a sixth transistor comprising a first end receiving a gate-off signal, a control end coupled to the first end of the fifth transistor, and a second end;

a seventh transistor comprising a first end coupled to the second end of the sixth transistor, a control end receiving the internal voltage, and a second end receiving the gate disable level;

an eighth transistor comprising a first end receiving the internal voltage, a control end coupled to the second end of the sixth transistor, and a second end receiving the gate disable level;

a ninth transistor comprising a first end coupled to the second end of the fourth transistor, a control end coupled to the second end of the sixth transistor, and a second end receiving the gate disable level;

a tenth transistor comprising a first end receiving the gate-off signal, a control end receiving a reset signal, and a second end coupled to the second end of the sixth transistor; and a timing all-on transistor comprising a first end receiving the gate enable level, a control end receiving an all-on signal, and a second end coupled to the internal voltage.

15. The display apparatus as claimed in claim 14, wherein the timing all-on transistor is configured to:

in the driving mode, be disabled based on the disabled all-on signal, thereby allowing the timing circuit to output a corresponding light-emitting timing signal based on the previous light-emitting timing signal; and in the sensing mode, be enabled based on the enabled all-on signal to provide the gate enable level to the fourth transistor, thereby enabling the fourth transistor, wherein the enabled fourth transistor directly outputs the gate enable level as the light-emitting timing signal.

16. The display apparatus as claimed in claim 14, wherein each of the light-emitting driving circuits further comprises a driving circuit, and the driving circuit comprises:

an eleventh transistor comprising a first end receiving the gate-off signal, a control end receiving the internal voltage, and a second end;

a twelfth transistor comprising a first end receiving the second end of the eleventh transistor, a control end receiving the gate enable level, and a second end;

a thirteenth transistor comprising a first end receiving a phase signal, a control end coupled to the second end of the twelfth transistor, and a second end providing a light-emitting driving signal;

a fourteenth transistor comprising a first end coupled to the second end of the eleventh transistor, a control end coupled to the second end of the sixth transistor, and a second end receiving the gate disable level;

a fifteenth transistor comprising a first end coupled to the second end of the thirteenth transistor, a control end coupled to the second end of the sixth transistor, and a second end receiving the gate disable level; and a driving all-on transistor, comprising a first end coupled to the first end of the fifteenth transistor, a control end receiving the all-on signal, and a second end receiving the gate enable level.

17. The display apparatus as claimed in claim 14, wherein the timing all-on transistor is configured to:

in the driving mode, be disabled based on the disabled all-on signal, thereby allowing the driving circuit to output a corresponding light-emitting driving signal based on the phase signal; and in the sensing mode, be enabled based on the enabled all-on signal, thereby directly outputting the gate enable level as the light-emitting driving signal.

* * * * *